Sept. 11, 1928.  
M. M. KOHN  
APPARATUS FOR PRODUCING DENTURES  
Filed July 3, 1924  
1,683,978  
2 Sheets-Sheet 1
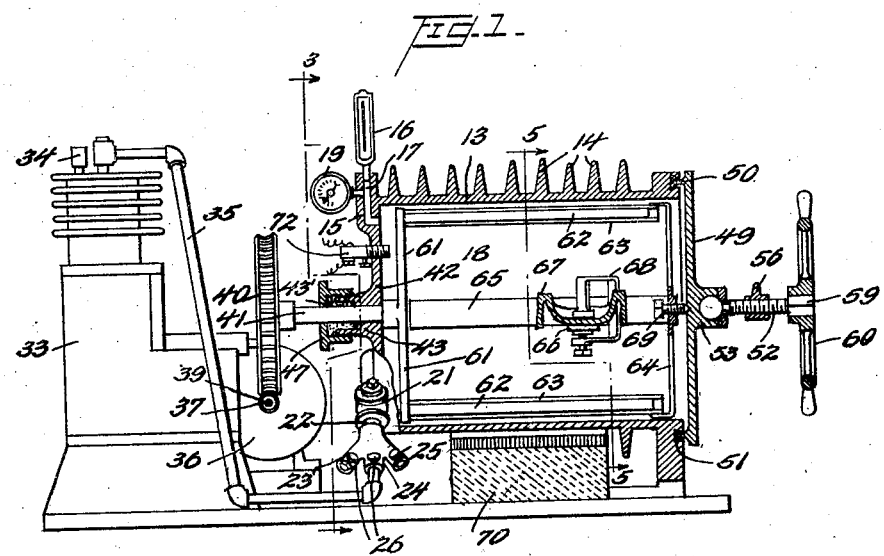
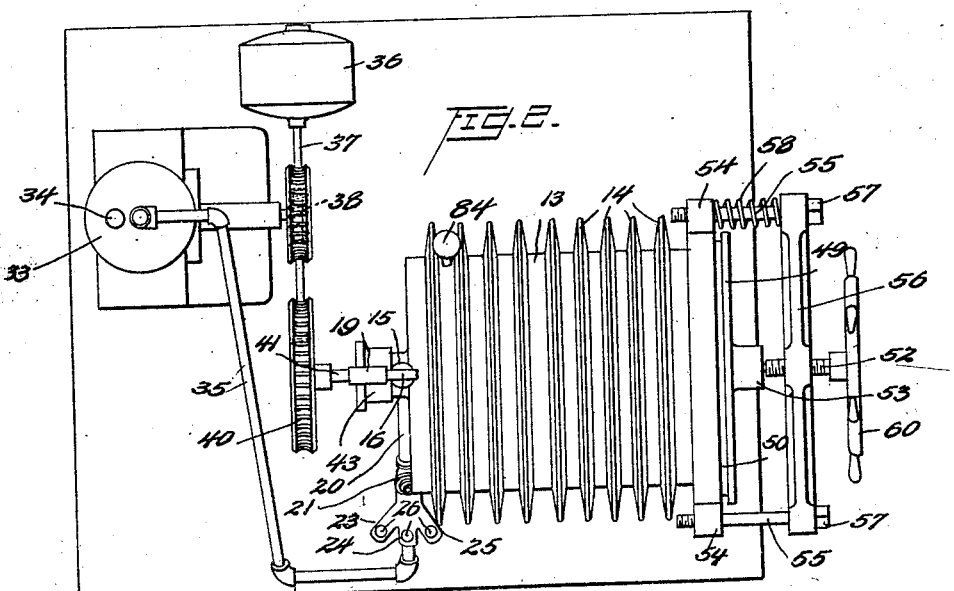
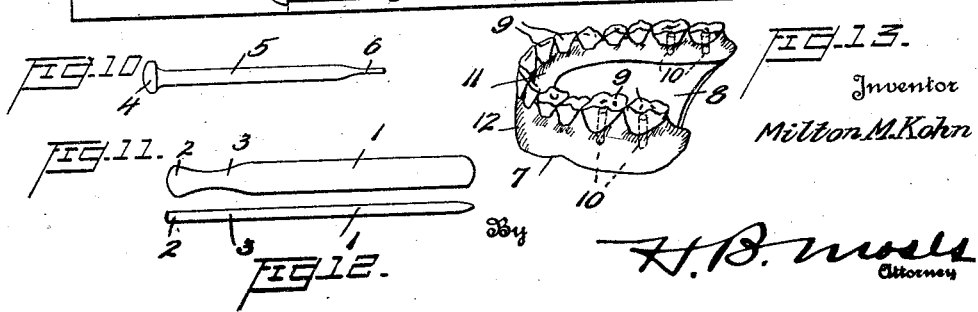
Inventor  
Milton M. Kohn Sept. 11, 1928.　　　　　　　　　　　　　　　　　1,683,978
M. M. KOHN
APPARATUS FOR PRODUCING DENTURES
Filed July 3, 1924　　　　2 Sheets-Sheet 2
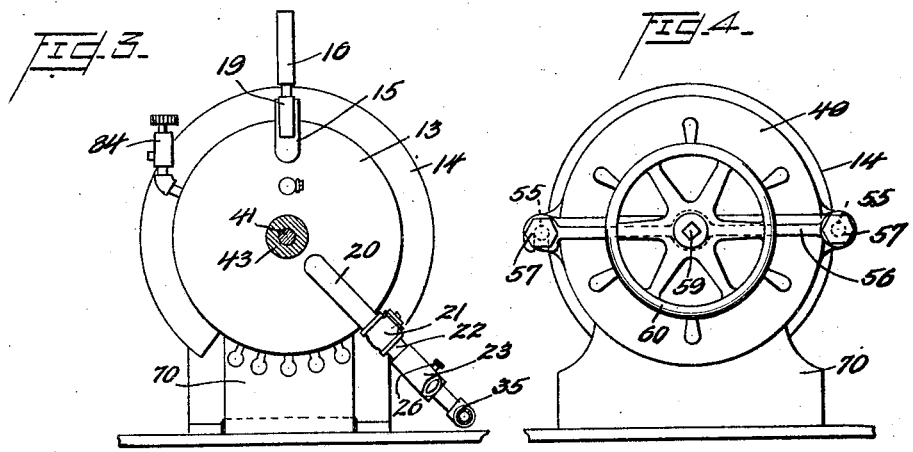
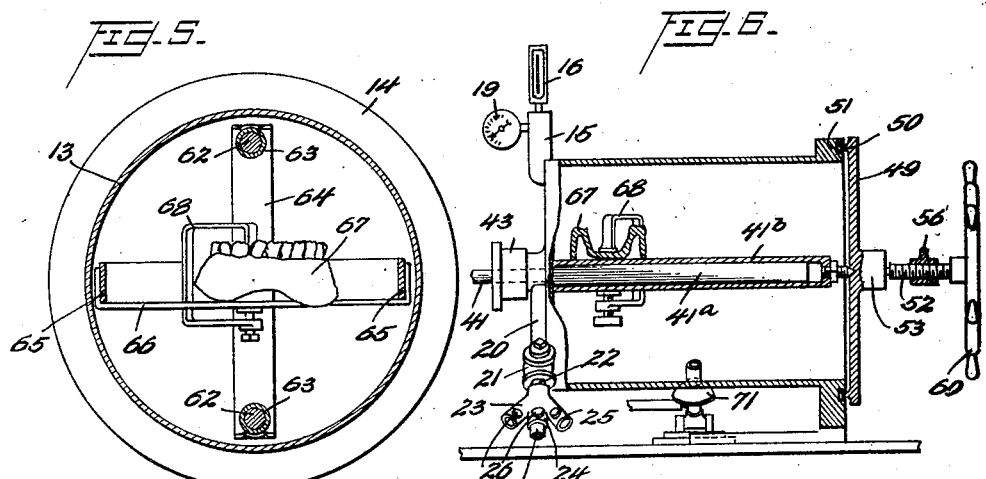
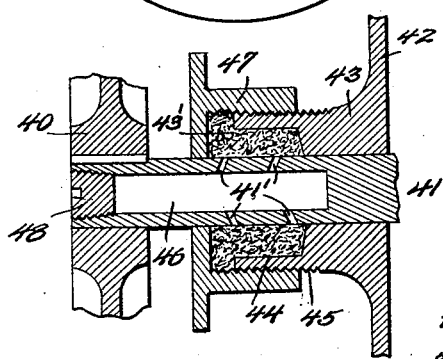
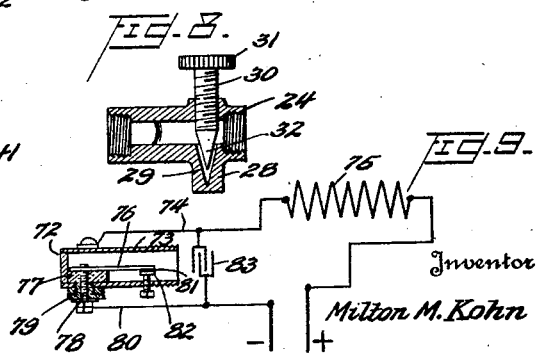
Inventor
Milton M. Kohn
By H. P. Newell
Attorney Patented Sept. 11, 1928.

1,683,978

UNITED STATES PATENT OFFICE.

MILTON M. KOHN, OF NEW YORK, N. Y.

APPARATUS FOR PRODUCING DENTURES.

Application filed July 3, 1924. Serial No. 724,155.

This invention relates to dentures and similar structures, the material for, method of, and apparatus for producing the same. It comprises the production of a denture or like structure having a front or veneer, or even a base itself, made of a plastic, phenolic, resin-like condensation compound, which may be tinted to any desired gum shade by the addition of proper pigments which are preferably either of an aniline or metallic nature, and which are mixed with the resin-like compound in a suitable manner, preferably either as a dry powder or as a powder suspended or dissolved in a liquid. This combined composition of matter, after the addition thereto of suitable hardening agents, such as acids, is mixed together in a crucible which is maintained at a uniform and proper temperature, and then applied to the making of dentures by suitably applying and shaping it and then hardening it.

It may be used for the whole of the denture base itself, but I prefer to apply it as a veneer to a denture which is otherwise complete, and this is festooned and finished to produce the desired design while still in a plastic state. After the application and festooning of the veneer, I suspend the denture, which includes the suitably tinted and shaped material capable of being hardened, on a suitable support or frame work, or otherwise attach it thereto, subject the same to suitable pressure and temperature while causing the support and the denture thereon to revolve. This causes hardening, or possible completion of the condensation of the applied resin-like material, without distortion of the configuration thereof, due to the fact that the denture revolves, whereby shaping of the plastic part thereof is maintained.

I thus produce a denture, at least the front of which is dense, and the exact color or tint desired, unaffected by mouth acids and other acids as well, and it will have a highly glazed or enamel-like surface.

Referring to the drawings:

Fig. 1 is a vertical, longitudinal sectional view, partly in elevation, of my hardening device;

Fig. 2 is a top plan view thereof;

Fig. 3 is a left end elevation of the hardening chamber on the line 3—3 of Fig. 1;

Fig. 4 is a right end elevation thereof;

Fig. 5 is a vertical sectional view on the line 5—5 of Fig. 1;

Fig. 6 is a longitudinal sectional view of a modification;

Fig. 7 is a detail sectional view illustrating the method of packing and lubricating the revolving shaft;

Fig. 8 is a detail view of the valve structure;

Fig. 9 is a sectional view of an electric thermostat control and a diagrammatic view of the thermostatic system;

Fig. 10 is a plan view of an instrument used in my process;

Fig. 11 is a plan view of another instrument used in my process;

Fig. 12 is an elevation thereof; and

Fig. 13 is a perspective view of a denture.

I use as raw material an incompletely reacted phenolic condensation product, in a very viscous condition. I may use, for example, 30–50 parts of formaldehyde and 75–100 parts of phenol, and suitably heat these to produce a plastic material, it being understood, of course, that the plastic material which I use is capable of being converted into a hard, insoluble, infusible, condensation product. A certain amount of this is placed in a small porcelain crucible or mortar to which is added a very small percentage of the coloring material. This is added either as a dry powder or it may be suspended or dissolved in a suitable liquid, such as acetone, which may, if desired, be diluted or intermixed with water or other materials. Inasmuch as I prefer the metallic pigments, as the aliline colors do not give such good and permanent results, I thus produce a suspension of the coloring matter in the liquid; but where coloring material is used which happens to be soluble in the liquid used, it will be obvious that a true solution is produced.

The crucible or mortar is then placed on a slightly heated surface, preferably of clay, the temperature being maintained at not over 160° F., in any well known manner, and this may be efficiently accomplished somewhere between 130° and 160° F. This causes the material to soften somewhat, that is, to become a little more viscous, and I then commingle the ingredients by stirring with a suitable instrument, such as a special form of spatula made of glass, horn, bone, or the like, for a period of about five minutes or so, or until the entire mass has become uniform. This spatula is illustrated in Figs. 11 and 12, and comprises a handle portion 1 and a working portion 2, necked in as at 3. A suitable hardening acid is added, such as hydrochloride acid, acetic acid, tartaric acid, phosphoric acid, and the like, either alone or in combination with each other in various proportions, and if desired, in combination with acetone. This acid is added drop by drop and the heating is continued, generally for about five minutes, until the material attains such a consistency that a portion lifted up with a small glass rod will remain suspended from the rod without dropping. A suitable rod therefor is illustrated in Fig. 10, and it has a handle portion 4, body portion 5, and pointed portion 6, the same being round in contour.

The raw material used, as stated, is a phenolic condensation product, is resin-like, and is very viscous, and has the capability of being converted into a hard, solid, dense, continuous mass by heating the same under suitable pressure after the addition of a hardening acid thereto, such as those stated above, which act apparently catalytically to accelerate the hardening.

The short heating alone has the effect, as stated, of causing the material to become more viscous and more fluid, and it would remain in this condition almost indefinitely if the hardening acid were not added as described. When the material has reached a body-like consistency it is spread on the surface of whatever piece of work it is to be applied to. In this body-like condition it will stick or adhere to the stirring rod or spatula until enough of the material is taken up, for example, by such a rod as is illustrated in Fig. 10, by rotating the pointed end of said rod in the material, and this is then rolled over the surface of the denture and is pressed into position thereon by means of this instrument, or by the operator's thumb or finger, and after being pressed and worked into position on the denture it is worked into the spaces between the teeth by means of the rod, and it is then festooned, if desired, by means of the same instrument.

In Fig. 13 I have illustrated a denture 7, comprising a plate 8 holding teeth 9 therein and these teeth may be fastened in any desired manner, as by a pin 10 attached to the plate 8 and extending into a perforation in the teeth. The inner part of the plate adjacent the gums is covered with the condensation product 11 as is the outer surface of the plate at 12.

After completing the shaping of the plastic condensation product and removal of the surplus thereof, I permanently harden the same by subjecting the whole denture to heat and fluid pressure while continuously revolving the same by means of my apparatus, and I prefer to use here a temperature of 160° F. While it is to be understood that a period of time approximating one hour in the enamelizer will produce a very satisfactory, finished product, a longer period of time in the enamelizer will considerably increase the density and also help to lighten the color, it being, however, understood that the temperature should not vary greatly from the temperature given. In this connection, after the work has been heated or cooked in the enamelizer for one hour, the material has set and is subject to no further physical change, so that if it is desired, because of rush of work, this or the cases can be removed from the enamelizer and placed in any ordinary drying oven, which is kept at the required temperature, namely 160° F., and held in such oven for any increased time desired.

This apparatus comprises a fixed casing 13 of more or less cylindrical shape, on the outer surface of which are annular ribs 14 for the purpose of equalizing the temperature. An enlargement 15 at one end of the casing is suitably bored to accommodate a thermometer 16, the bored passage 17 communicating with the interior 18 of the casing. A pressure indicator 19 is suitably connected with the bored passage 17. Another similar bored enlargement 20 has attached thereto a check valve 21 permitting flow of gas or any other fluid pressure only toward the interior of the casing. Attached to this check valve 21 is a pipe 22 terminating in a three-way fitting, the different branches 23, 24, 25, of which may be connected to sources of different gases, such as air, nitrogen, carbon dioxide, etc., whereby any of these gases may be used interchangeably without necessitating the making or taking apart of any connections. At the end of each of the branches, 23, 24, 25, is a needle valve 26 comprising a tube and a projection 28 thereon, with a cone-shaped interior 29. Threaded into this tubing is a screw 30 having a handle 31 and a pointed end 32 to fit tightly in the cone-shaped hollowed portion 28, the dimensions of the part 30 being such that when the needle valve is screwed down tight no air will pass from one end of the valve to the other. 33 designates a compressor which may be power driven, having the usual safety or unloading valve 34, and a pipe connection 35, to connect with one of the branches 23, 24, 25 of the three-way fitting. The motor 36 causes rotation of the shaft 37 on which are attached the worm gears 38 and 39, the worm gear 38 causing actuation of the compressor and the worm gear 39 causing actuation of the worm wheel 40 which is fast on the shaft 41 which passes through the wall 42 of the casing. This wall is enlarged as at 43, the enlargement being hollowed interiorly as at 44 and threaded exteriorly as at 45. The end of the shaft 41 is hollowed as at 46 and the interior thereof is connected with the space 44 by means of the ducts 41¹. Suitable packing 43¹ is located within the space 44 and this is held in place by a perforated cap nut 47, the shaft passing through the perforation thereof. A tight joint, and lubrication thereof, are achieved by this construction, the space 44 having oil therein which is held in place by the screw block 48, and this works its way through the ducts 41¹ into the packing and along where the lubrication is needed, at the same time affording a tight joint.

A removable cap or manhole 49, having an annular rib 50 inserted within the packed annular groove 51 of the casing, is held there in place by means of a screw 52 abutting against the projection 53 of the cap or cover. A suitable yoke 54 is located on the device into the ends of which are secured the bolts 55. Another yoke 56 is perforated at its ends and the bolts 55 pass through these perforations, the heads 57 of such bolts preventing the yoke 56 from falling off therefrom. A suitable spring tension device 58 may be applied to one of these bolts for the purpose of positioning the yoke 56. The threads of the screw 52 register with the threads cut interiorly of the central portion of the yoke 56, and it will be obvious that the revolution of the screw 52 in one direction will tighten down the cover, and in the other direction will permit removal of the cover. The outer end of the screw 52 may have a square, hexagonal, or other non-circular contour 59 for the application of a wrench (not shown) or a hand wheel 60.

Arms 61 radiate from the shaft 41 and at the ends thereof are fastened rods 62 extending parallel with the shaft and within the casing. Slidable on these rods and removable therefrom by sliding outwardly when the door has been removed are tubes 63 suitably connected with each other as by a connecting member 64. I generally use two diametrically disposed sets of rods and tubes; and at about 90° between these I may provide flat arms 65 diametrically disposed to each other. A U-shaped member 66 is suitably connected at its two ends to the arms 65. The piece of work or denture 67 is suitably supported on this U-shaped member 66 by suitably attaching the same thereto as by means of a clamp 68. It will thus be apparent that rotation of the worm wheel 40 causes rotation of the work. Threaded in the connecting member 64 at the central point thereof is a pointed screw 69 to act as a bearing when the door 49 is pressed against the point thereof.

The two driving worms 38 and 39 are so connected to the shaft 37, as by means of a clutch, that revolution of the work may be caused from the beginning of the operation to the end thereof, while the compressor 70 need not be operated continuously but only when it is necessary to increase the pressure within the heating casing, the pressure in which regulates the discharge of air from the compressor.

An alternative form of my invention is shown in Fig. 6 where the shaft 41ª extends to a point very near the door. This shaft is made square or otherwise non-circular, and over this slides the square, or similarly shaped, tube 41ᵇ, to which the work 67 is held by the clamp 68. In this invention the work is clamped to the sleeve which is then slid over the shaft, while in the modification previously described the work is clamped to the support and this is then placed within the casing by sliding the tubes 63 over the bars 62.

An electric heater 70 may be used to produce the desired temperature in the casing, or a gas heater 71 may be substituted therefor, and as the details of this form no part of the invention, they need not be further described. I prefer to use a thermostatic control for the heating means and where I use an electrical heating means I use a control such as that illustrated in Fig. 9, no thermostat for the gas heating means being illustrated.

This thermostat 72 is inserted within the wall of the casing, as shown in Fig. 1, and comprises a metal tube 73 to which is connected a lead wire 74 leading to the heating resistance 75 which is connected to one pole of the source of current. A ribbon 76 of thermos metal rests at one end in a groove in an insulating block 77 and is in electrical connection with the binding post 78 passing through a wall of the tube 73 without contact therewith, it being insulated therefrom by an insulating bushing 79, the binding post being connected by means of a lead wire 80 with the other pole of the source of current.

The thermos element 76 flexes or bends with variation in temperature and carries at its end a contact 81 which makes or breaks contact with the fixed adjustable contact 82 electrically connected with the tube 73. A condenser 83 is interposed between the lead wires 74 and 80 for the purpose of decreasing the spark between the contacts 81 and 82 when the contact therebetween is broken.

A blow-off valve 84 is located on the heating casing for the purpose of releasing or decreasing the pressure therein at the end of the operation and when this becomes desirable.

After the work is ready to be hardened

I place the same within the heating tank, close the same, and start rotation of the work and application of pressure thereto as soon as possible, the pressure ranging from 50–150 pounds per square inch, for the purpose of "densifying" the material. After the pressure has been applied for 10–15 minutes, heat is applied and the material is maintained at 158° F. I have found that this temperature is by far the best for hardening the material without deformation thereof, as the material becomes too soft if heated too highly. I prefer the use of gas pressure, as described, for the reason that it is uniform throughout, and it has what might be termed "elastic pressure". Various gases may be used as desired, but it will be found that exposure to oxygen causes oxidation and consequent discoloration. The temperature is maintained very even by means of the thermostat, within 1 or 2 degrees. I have found from ten (10) to forty (40) revolutions a minute to be a very efficient speed of rotation of the work and with this speed and the temperature and pressure indicated the material used will harden in 15–20 minutes when the operation is concluded.

With the properly selected tint veins of a blood color may be made in the material by making cuts or creases in it with a sharp edged instrument. In the process of heating the cuts close almost but not entirely which gives a very good simulation of veins.

Although I have described and illustrated various devices and methods for heating, nevertheless I wish it to be understood that the heating may be accomplished by any suitable device or method, whether direct or indirect, as by a sand bath or a water bath.

I prefer to attach the thermometer to the device, the temperature of which is to indicate, in such a manner that the thermometer may be readily removed, and on the removal thereof there will be no tendency of the hot gases to escape. This may be accomplished in any well known manner, the simplest of this comprising having a hollow plug threaded interiorally and exteriorally, and screwed into a correspondingly threaded opening in the casing, the thermometer carirer being screw threaded and screwed into the interior threads of the plug I have found that dextrin, agar-agar, glucose, tragacanth, etc., in concentrated solution in water, or glycerin, either mixed with the material or applied thereto while it is in the plastic condition, will very much reduce the stickiness thereof, and they further advantageously affect the translucency of the product.

Having described my invetnion what I claim as new and desire to secure by Letters Patent of the United States, is:

1. A device comprising a casing, a closure for said casing, means for heating said casing, an element adapted for rotation in said casing and extending longitudinally thereof, a tube for holding work adapted to fit over said element, a bearing for said tube in said closure and means for rotating said element and tube.

2. A device comprising a casing, a closure for said casing, means for heating said casing, an element adapted for rotation in said casing, a tube for holding work removably mounted on said element, a bearing for said tube in said closure, a gas inlet pipe connected to said casing, a compressor connected to said inlet pipe, a single source of power, and means for both operating said compressor and rotating said element from said single source of power.

3. A device comprising a casing, a shaft extending into said casing, arms on said shaft, rods on said arms and disposed longitudinally of said casing, tubes slidably mounted on said rods, supporting means connected to said tubes, and means for rotating said shaft.

4. A device comprising a casing, a removable cover at one end of said casing, a shaft extending into the opposite end of said casing, a rod fixed to said shaft and disposed longitudinally of said casing, a tube slidably mounted on said rod and having a bearing in said removable cover, supporting means connected to said tube, and means for rotating said shaft.

MILTON M. KOHN.